W. H. TRENWITH.
Wheels for Vehicles.
No. 133,605.   Patented Dec. 3, 1872.
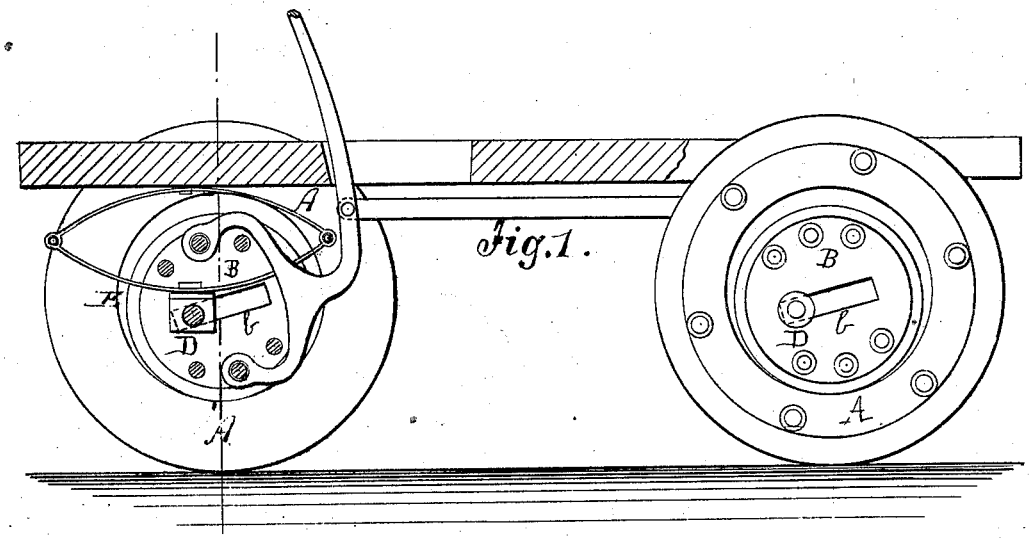
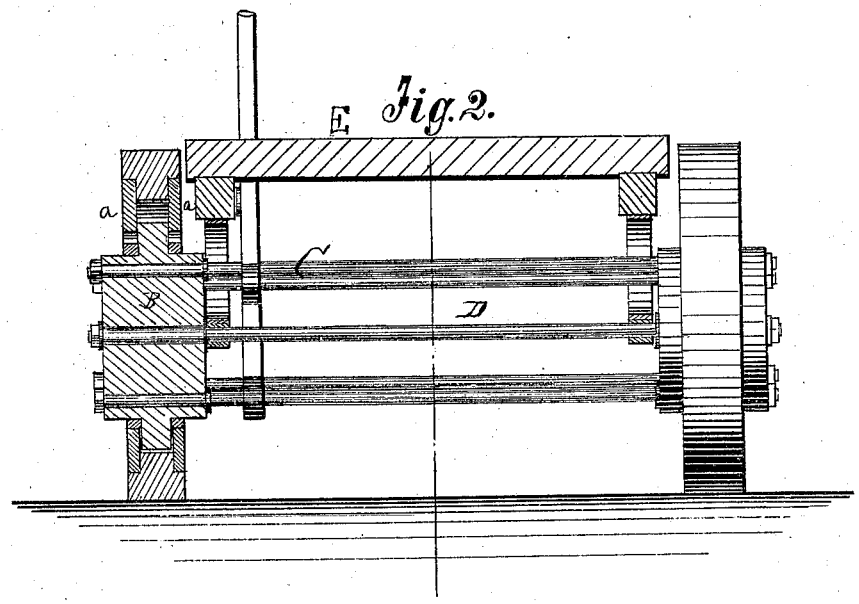
Witnesses:
A. Bennerkendorf.
Geo. W. Mabee
Inventor:
W. H. Trenwith
PER
Attorneys.

UNITED STATES PATENT OFFICE.

WILLIAM H. TRENWITH, OF BROOKLYN, NEW YORK.

IMPROVEMENT IN WHEELS FOR VEHICLES.

Specification forming part of Letters Patent No. 133,605, dated December 3, 1872.

*To all whom it may concern:*

Be it known that I, WILLIAM H. TRENWITH, of Brooklyn, in the county of Kings and State of New York, have invented a new and Improved Wheel for Vehicles, of which the following is a specification:

Figure 1 represents a face view of my improved wheel. Fig. 2 is a face view of two such wheels on one vehicle. Fig. 3 is a vertical transverse section of a pair of wheels.

Similar letters of reference indicate corresponding parts.

The object of this invention is to provide means whereby the burden of a vehicle and its load may be utilized as an aid in advancing or retarding the progress of the vehicle; and it consists of a movable wheel arranged within a revolving traction-wheel of larger diameter, and provided with a diametrical slot, in which is a movable axle that supports the body of the vehicle in the usual manner.

In the accompanying drawing, A represents a hollow wheel, provided with the flanges *a a*, one of which, at least, is detachable, and both of which form an annular groove, in which is a wheel, B, provided with a diametrical slot, *b*, and so fitted as to allow the traction-wheel to move freely on it. Fitted to move freely in the diametrical slot is the box of an inner axle, D, upon which the vehicle rests. When used in pairs the wheels B are connected together by means of rods C C, to two or more of which is attached a hand-lever, which passes up through an aperture of the required dimensions in the bottom of the vehicle. By means of this lever the wheels B can be turned axially forward or backward in the wheel A, according as it is desired to use the weight of the load as an aid in advancing or retarding the progress of the vehicle.

By my invention the line of the respective centers of gravity, which usually pass through the axis of wheel, and the point of contact which the wheel makes with the road may be made to fall in front or in rear of the wheels. This is done by simply pressing the lever to its furthest forward or backward limit, and thus giving an inclined position to the diametrical slot, in which the movable supports will then descend, and thus the tendency of the weight of the vehicle will be to advance or retard the movement of the same, according as this weight is forward or in rear of the axis of the outer revolving wheels.

It will thus be seen that three important advantages are secured—namely: First, the utilization of the weight of the vehicle and its load as an aid to facilitate the starting of the vehicle; second, the use of the weight of the vehicle and its load as a constantly-acting power in aid of the animal or other power used to draw the vehicle; third, the utilization of the weight of the vehicle and its load in retarding the forward movement of the vehicle.

Having thus described my invention, what I claim as new, and desire to secure by Letters Patent, is—

The movable wheel B provided with a diametrical slot, and having therein the box of an inner axle, D, in combination with the outer or revolving traction-wheel A, as and for the purpose specified.

WILLIAM H. TRENWITH.

Witnesses:
    A. S. CREAGH,
    GEO. W. MABEE.